(12) United States Patent
Mizuno et al.

(10) Patent No.: US 6,876,773 B2
(45) Date of Patent: Apr. 5, 2005

(54) APPARATUS AND METHOD FOR CODING BINARY IMAGE WITH IMPROVED EFFICIENCY

(75) Inventors: Osamu Mizuno, Tokyo (JP); Shinichi Sakaida, Tokyo (JP); Yoshiaki Shishikui, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 674 days.

(21) Appl. No.: 09/898,984

(22) Filed: Jul. 3, 2001

(65) Prior Publication Data

US 2002/0048409 A1 Apr. 25, 2002

(30) Foreign Application Priority Data

Oct. 23, 2000 (JP) ........................................ 2000-322696

(51) Int. Cl.[7] .............................. G06K 9/36; H04N 7/12
(52) U.S. Cl. .................................. 382/243; 375/240.24
(58) Field of Search ................................ 382/243–236, 382/232; 358/539, 426.01, 426.16; 375/240, 240.01, 240.08, 240.24

(56) References Cited

U.S. PATENT DOCUMENTS

| | | | | | |
|---|---|---|---|---|---|
| 6,035,070 | A | * | 3/2000 | Moon et al. ................ | 382/243 |
| 6,078,695 | A | * | 6/2000 | Kadono ...................... | 382/243 |
| 6,154,570 | A | * | 11/2000 | Boon ......................... | 382/236 |
| 6,208,693 | B1 | * | 3/2001 | Chen et al. ............. | 375/240.24 |
| 6,373,988 | B1 | * | 4/2002 | Thorell et al. ............. | 382/240 |
| 6,377,622 | B1 | * | 4/2002 | Kim et al. .................. | 375/240 |

FOREIGN PATENT DOCUMENTS

| JP | 61-032664 | 2/1986 |
|---|---|---|
| JP | 61-128678 | 6/1986 |
| JP | 63-310274 | 12/1988 |
| JP | 64-017567 | 1/1989 |
| JP | 2-017766 | 1/1990 |
| JP | 5-022611 | 1/1993 |
| JP | 7-079352 | 3/1995 |
| JP | 10-004549 | 1/1998 |
| JP | 11-055667 | 2/1999 |
| JP | 2000-050258 | 2/2000 |
| JP | 2000-069298 | 3/2000 |

OTHER PUBLICATIONS

"Multi–resolution shape coding algorithm for MPEG–4," Chen, Mei–Juan et al., IEEE Transactions on Consumer Electronics, Vo 46, No. 3. Aug. 2000, pp. 505–513.*

* cited by examiner

Primary Examiner—Wenpeng Chen
(74) Attorney, Agent, or Firm—Ladas & Parry LLP

(57) ABSTRACT

An apparatus for coding a binary image representing an object shape includes an inferior symbol detecting unit which decides which one of binary zero and binary one is an inferior symbol that is of smaller occurrence within a given area of the binary image, a divided portion generating unit which divides a rectangular block of the given area into divided portions, a map information generating unit which generates map information for each one of the divided portions, the map information indicating whether a corresponding one of the divided portions has the inferior symbol included therein, and a coding unit which encodes only the divided portions that have the inferior symbol included therein, wherein an identification of the inferior symbol, the map information, and the encoded divided portions are output from the apparatus.

16 Claims, 6 Drawing Sheets

☐ LINE EXCLUSIVELY COMPRISED OF SUPERIOR SYMBOLS

▨ LINE INCLUDING INFERIOR SYMBOLS

APPARATUS AND METHOD FOR CODING BINARY IMAGE WITH IMPROVED EFFICIENCY

BACKGROUND OF THE INVENTION

1. Field of the Invention

The present invention generally relates to object-shape coding apparatuses for coding a binary image representing an object shape by the unit of one rectangular block where the binary image is divided into a plurality of rectangular blocks, and particularly relates to an object-shape coding apparatus for coding rectangular blocks which includes both the pixels of the interior of the object shape and the pixels of the exterior of the object shape.

2. Description of the Related Art

In recent years, interest has been high in object-based coding schemes such as ISO/IEC 14496-2: "Information Technology-Generic Coding of Audio-Visual Objects-Part2: Visual." The object-based coding divides an original image into the images of objects such as people or the like in the foreground and objects in the background, and attends to image coding with respect to each object image separately. The object-based coding can achieve a higher coding efficiency than coding schemes based on the coding of image frame units such as the MPEG-2 video coding standard (ISO/IEC 13818-2: "Information Technology-Generic Coding of Moving Pictures and Associated Audio Information: Video"). Further, use of object-based coding provides a basis for making of a video by combining objects.

An object image is comprised of texture images and object-shape data. In the object-base coding, therefore, both the texture coding and the shape coding are performed. Shape data includes binary data of shape information that only represents shape, and further includes multi-level data of shape information that represents object transparency. The present invention relates to the binary data of shape information.

In the following, related-art methods for binary shape coding will be described.

There are two types of methods for representing object shapes. One is to use a bit pattern image that has binary values representing whether pixels are inside or outside the object boundary, and the other is to show only the object boundaries. Accordingly, object-based coding apparatuses can also be classified into two groups, one for coding binary bit pattern images and the other for coding contour data.

Methods for coding binary bit pattern images attend to binary information coding by following the order of image scanning. Typical coding methods include the JBIG standard (ISO/IEC 11544: "Progressive Bi-level Compression") and the MMR (modified modified read) coding standard (ITU-T T.6: "Facsimile Coding Schemes and Coding Control Functions for Group 4 Facsimile Apparatus"). The JBIG standard encodes binary data in a hierarchical manner by following the order of image scanning. The MMR standard encodes positions where binary pixels undergo changes in values, which is performed by following the order of image scanning. Both of these two coding methods are loss-less processes.

Methods for coding contour information attends to coding by following the order of points that make up the contour. Such methods include one that encodes directions of points that constitute the contour, and include one that reversibly encodes the coordinates of points that constitutes the contour. Among these, a chain coding scheme (Makoto Nagao, "Digital Image Processing," Kindaikagaku, pp.384–385, 1987) assigns integers 1 through 8 to directions of connections relating the points that constitute the contour, and attends to reversible coding. Further, there is a method that carries out hierarchical coding by using the chain coding scheme (Tohru Kaneko, "Hierarchical Coding Scheme for Line Drawings Described by Chain Code Series," The Transactions of the Institute of Electronics, Information and Communication Engineers, Vol. J69-D, No. 5, 1986).

Further, methods for coding contour information include approximating for the contour by using the Spline function (Myron Flickner, et al., "Periodic Quasi-Orthogonal Spline Bases and Applications to Least-Squares Curve Fitting of Digital Images," IEEE Transaction on Image Processing, vol. 5, No. 1, pp. 71–88, January. 1996), and also include a method using Wavelet descriptors (George Muller, et al., "Progressive Transmission of Line Drawings Using the Wavelet Transform," IEEE Transaction on Image Processing, vol. 5, No. 4, pp. 666–672, April 1996). Also included is a method that uses Wavelet descriptors for contour direction vectors (Japanese Patent Laid-open Application No. 11-255420).

All the binary shape coding methods as described above encode object shapes by the unit of one frame.

In general, texture coding is conducted by the unit of one rectangular block after an original image is divided into a plurality of rectangular blocks. Among texture information within a given rectangular block, information is useful where it corresponds to the area of the object defined by the shape data. In order to keep consistency between the texture coding and the shape coding, some shape coding schemes employ division of an image into a plurality of rectangular blocks, and attend to block-specific coding.

The binary shape coding of the MPEG-4 standard divides a binary shape image into a plurality of rectangular blocks (macro blocks) of 16×16 pixels where the binary shape image is comprised of shape interior pixels and shape exterior pixels, and attends to coding on the block-specific basis. The MPEG-4 standard is applicable to intra-frame coding as well as inter-frame coding. In the following, the intra-frame coding will be described.

In the intra-frame coding, a coding mode is selected based on the conditions of the rectangular block, i.e., based on whether all the pixels of the rectangular block are those of the shape interior, whether all the pixels are those of the shape exterior, and whether the shape interior pixels and the shape exterior pixels are both present inside the rectangular block. When all the pixels are shape interior pixels, or are shape exterior pixels, only the coding mode is transferred, without coding of each pixel. When the shape interior pixels and the shape exterior pixels are both present, a coded word is assigned to each pixel through arithmetic coding.

The arithmetic coding is a type of a variable length coding scheme that reduces the quantity of information by utilizing disparity of symbol occurrence probabilities. In this coding scheme, a probability line segment is segmented according to the probabilities of occurrences of a symbol series, and a binary decimal value indicative of a position within a segmented section is used as a code for the symbol series (Hiroshi Harashima, "Image Information Compression," Ohm, pp. 153–161, 1992.7). In the arithmetic coding, segmentation of a probability line based on probabilities of occurrences of a symbol series can be consecutively made through arithmetic operations, which achieves a compression efficiency that is close to the entropy limit of the symbol series.

The Huffman coding is known as a variable length coding scheme that reduces the quantity of information by utilizing inequality of symbol occurrence probabilities in the same manner as in the arithmetic coding (Hiroshi Yasuda, Hiroshi Watanabe, "Basics of Digital Image Compression," Nikkei BP Publishing Center, pp. 32–35, 1996). In the Huffman coding, one coded word is assigned to one symbol. Since the Huffman coding only requires reading a coded word for a given symbol from the coded word table stored in memory, a coding apparatus can be implemented as a small size apparatus.

As described above, the MPEG-4 arithmetic coding has macro blocks of 16×16 pixels as input thereto, and attends to consecutive segmentation of a probability line segment for 256 pixel symbols. In general, coding efficiency increases as the processing block becomes bigger, but an increase in the processing block size entails needs for increased computation and increased memory. This is one of the factors that make it difficult to develop a real-time coding apparatus for an image of a large size such as an HDTV image.

In order to reduce the computation load and the memory volume, input data may be coded by the unit of a small data size. Since real-time processing is performed by use of hardware, however, correlation within the data cannot be fully utilized if the coding is performed by the unit of a small data size. In order to obviate this problem, it is desirable to provide a coding apparatus that can achieve efficient coding while avoiding an increase in the size of hardware for code assigning process.

Accordingly, there is a need for an object-shape coding apparatus that can achieve efficient coding while avoiding an increase in the size of hardware for code assigning processing where the object-shape coding apparatus divides a binary image representing an object shape into a plurality of rectangular blocks, and encodes each of the rectangular blocks separately, including a rectangular block which includes both object interior pixels and object exterior pixels.

SUMMARY OF THE INVENTION

It is a general object of the present invention to provide a coding apparatus and a coding method that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a coding apparatus and a coding method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an apparatus for coding a binary image representing an object shape, the apparatus including an inferior symbol detecting unit which decides which one of binary zero and binary one is an inferior symbol that is of smaller occurrence within a given area of the binary image, a divided portion generating unit which divides a rectangular block of the given area into divided portions, a map information generating unit which generates map information for each one of the divided portions, the map information indicating whether a corresponding one of the divided portions has the inferior symbol included therein, and a coding unit which encodes only the divided portions that have the inferior symbol included therein, wherein an identification of the inferior symbol, the map information, and the encoded divided portions are output from the apparatus.

The coding apparatus as described above divides a binary rectangular block that includes object interior pixels and object exterior pixels, one of which is inferior to the other in terms of frequency of occurrence, and the divided portions are encoded only when there is an inferior symbol included therein, thereby achieving efficient coding of the binary image representing an object shape.

Further, the coding apparatus as described above reduces the load of the coding process while avoiding an efficiency reduction caused by data division, thereby making possible the real-time coding of a large shape image such as an image having the size of an HDTV image.

DESCRIPTION OF THE PREFERRED EMBODIMENTS

In the following, embodiments of the present invention will be described with reference to the accompanying drawings.

Before engaging in the describing of embodiments, the principle of the present invention will be described briefly.

In the description that follows, pixels that are either interior pixels within the object boundary or exterior pixels outside the object boundary are defined as inferior symbols if they are those of smaller occurrence between the two types of pixels within the macro block, whereas the pixels of greater occurrence between the two types of pixels are referred to as superior symbols.

Pixels that represent an object shape have relatively high correlation therebetween, so that the inferior symbols or the superior symbols tend to be concentrated. Since the superior symbols are defined as those outnumbering the inferior symbols, there may be a case in which all the data within a divided portion are superior symbols. In the present invention, data indicative of whether at least one inferior symbol exists within the divided portion or indicative of whether all the data within the divided portion are superior symbols is transferred as a structural representation. (Hereinafter, this data is referred to as map information.) Use of map information as a structural representation makes it possible to eliminate a need for coding a divided portion comprised only of the superior symbols. This achieves an improved coding efficiency.

In the present invention, a macro block is divided into a plurality of smaller blocks according to a predetermined procedure, and the obtained smaller blocks are further divided into pixel lines (lines of pixels) in the horizontal or vertical direction, thereby providing two stage data division. At each stage of data division, map information for divided data is transferred. The second stage division is not performed if the divided data obtained at the first stage include only superior symbols.

A coded word is assigned to a bit pattern of a divided pixel line by using a variable length coding. In the present invention, pixels are rearranged first according to a predetermined rearrangement procedure such as placing inferior symbols at the beginning of a pixel line, and, then, the rearranged bit pattern is coded and transferred. In this case, information about the data rearrangement needs to be additionally transmitted. Since the rearrangement improves the efficiency of variable length coding, however, the overall coding efficiency is also improved.

In this manner, the present invention divides shape data along with use of structural representations, and assigns coded words. Namely, data division provides a basis for a simplified coding process, and use of the structural representation achieves highly efficient coding.

Figure 1:
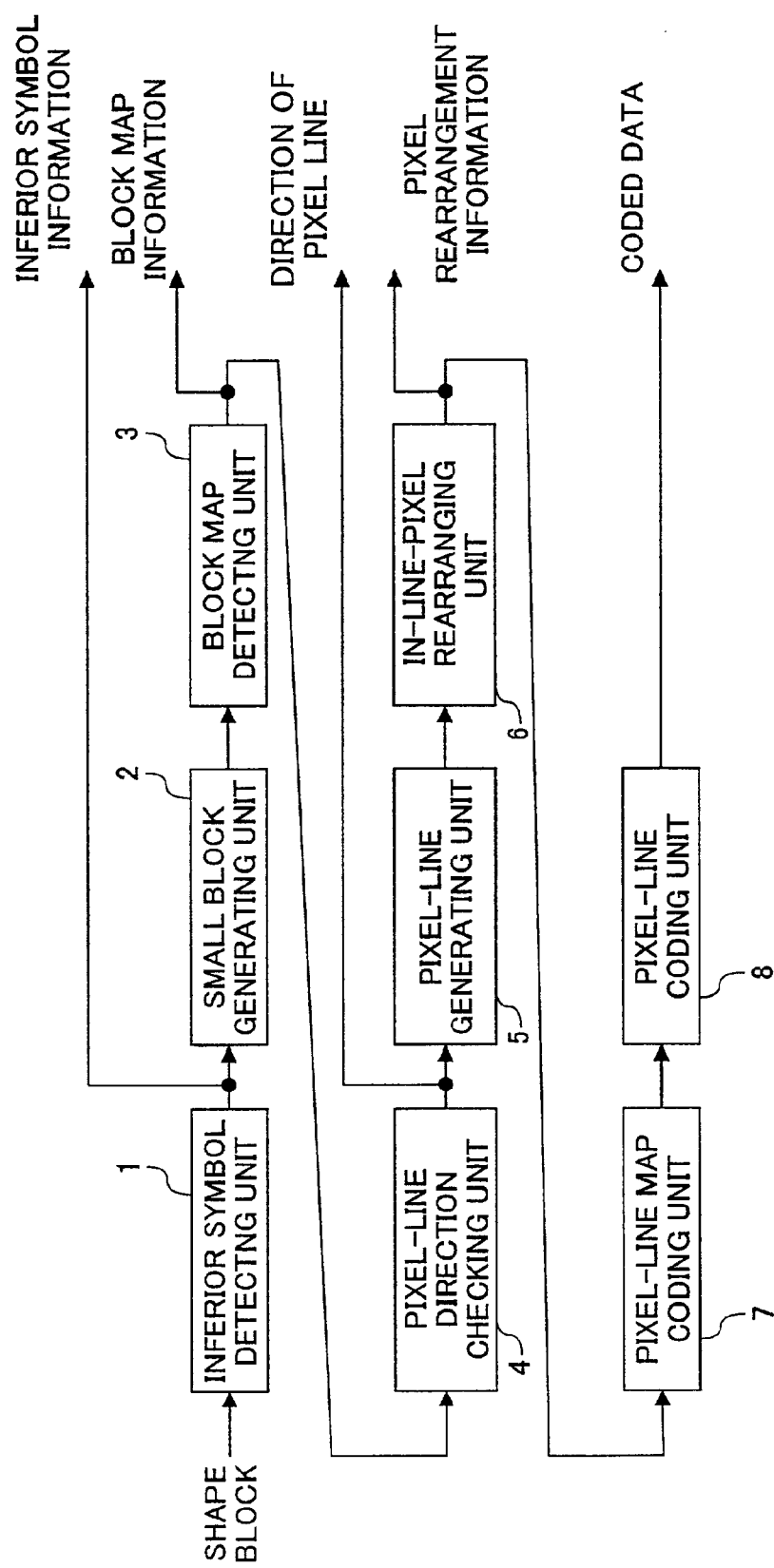
FIG. 1 is a block diagram of an object-shape coding apparatus according to the present invention.

FIG. 1 is a block diagram of an object-shape coding apparatus according to the present invention.

In FIG. 1, the object-shape coding apparatus includes an inferior symbol detecting unit 1, a small block generating unit 2, a block map detecting unit 3, a pixel-line direction checking unit 4, a pixel-line generating unit 5, an in-line-pixel rearranging unit 6, a pixel-line map coding unit 7, a pixel-line coding unit 8.

In the following, operations of the object-shape coding apparatus will be described.

As input signals to the coding apparatus, the inferior symbol detecting unit 1 receives a rectangular macro block which includes object interior pixels as well as object exterior pixels. The inferior symbol detecting unit 1 outputs a macro block bit pattern that represents an image by two statuses, i.e., the inferior symbol defined as that of lesser occurrence between the interior pixels and the superior pixels in the macro block and the superior symbol defined as that of greater occurrence in the macro block. Further, the inferior symbol detecting unit 1 supplies information about the inferior symbol, which is transmitted along with coded data.

Each pixel of the macro block input to the apparatus of the present invention is either an object interior pixel or an object exterior pixel. In the following description, blocks and pixel lines are described as being a bit pattern having two statuses, i.e., the inferior symbol status and the superior symbol status.

Figure 2:
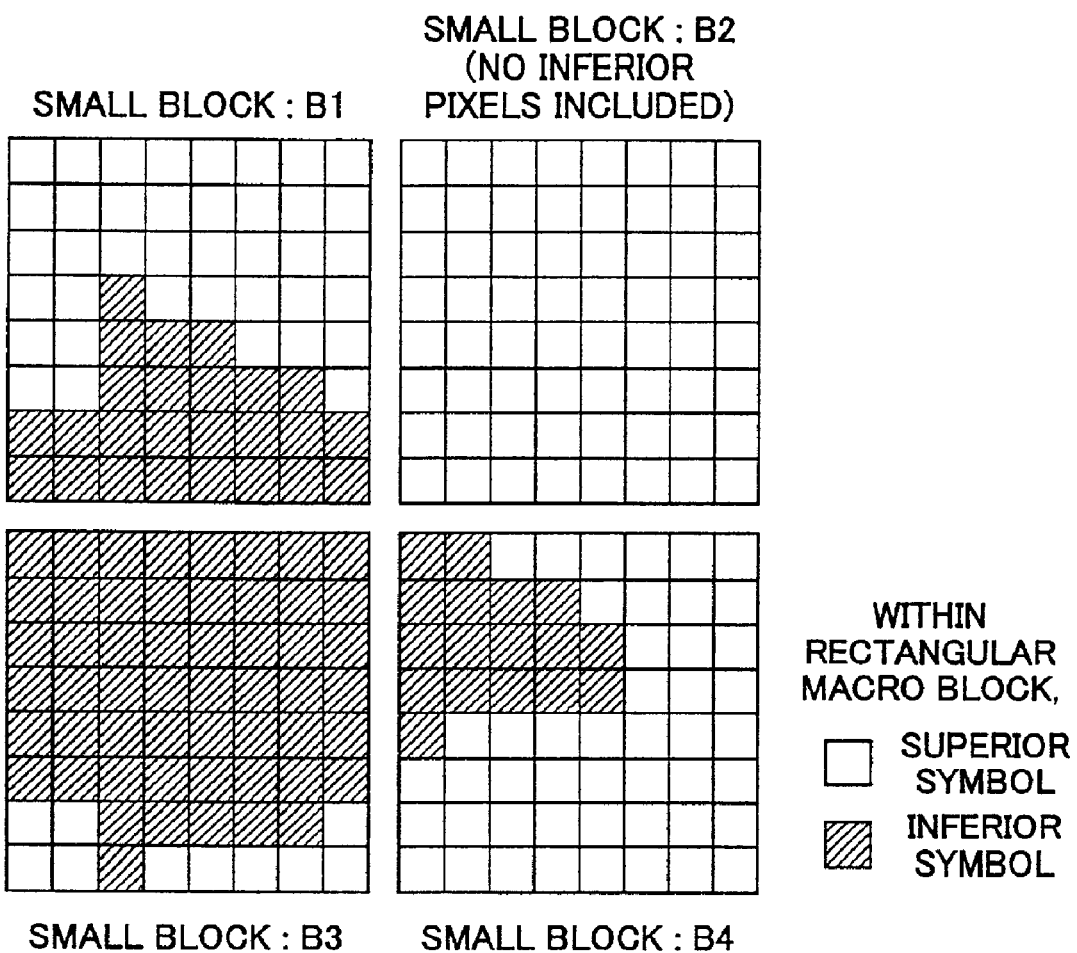
FIG. 2 is an illustrative drawing showing a macro block having both inferior symbols and superior symbols and divided in half in both the vertical direction and the horizontal direction.

The macro block bit pattern supplied from the inferior symbol detecting unit 1 is input to the small block generating unit 2, which outputs a plurality of small blocks of bit patterns generated by dividing the macro block. The present invention is not limited to a particular method of dividing a macro block into small blocks. As an example, as shown in FIG. 2, a macro block having both inferior symbols and superior symbols may be divided in half in both the vertical direction and the horizontal direction, thereby generating four small blocks.

The plurality of small blocks of bit patterns supplied from the small block generating unit 2 are input to the block map detecting unit 3, which outputs block map information indicative of whether an inferior symbol is present in each small block. This block map information is transmitted along with coded data. If there is an inferior symbol in a given small block, the bit pattern of this given small block is also output from the block map detecting unit 3.

Figure 3:
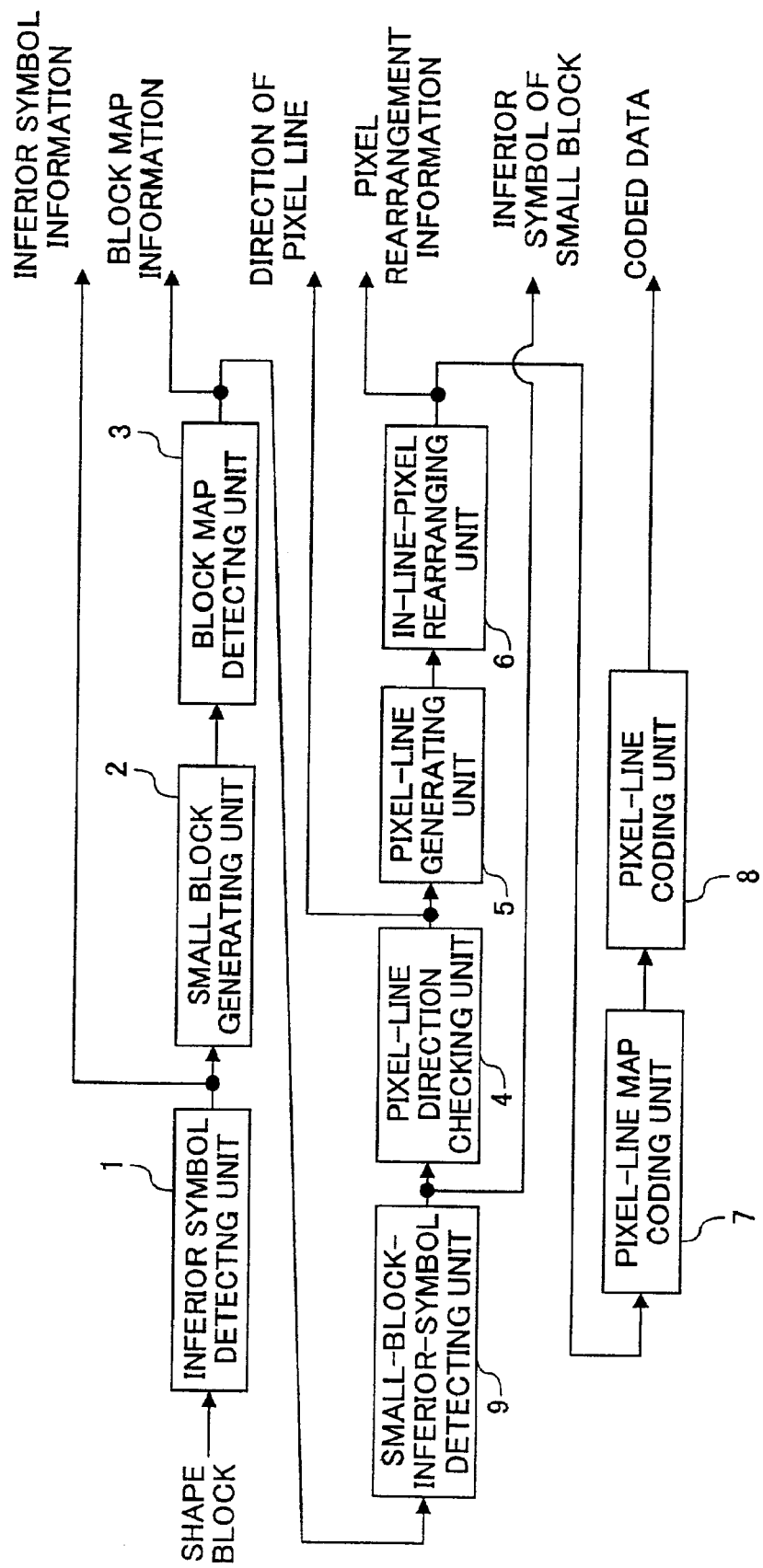
FIG. 3 is a block diagram of another embodiment of the object-shape coding apparatus according to the present invention, which includes a unit that identifies an inferior symbol for each small block.

FIG. 3 is a block diagram of another embodiment of the object-shape coding apparatus according to the present invention which includes a unit that detects the inferior symbol for each small block.

When the configuration of FIG. 3 is compared with the configuration of FIG. 1, the configuration of FIG. 3 has a small-block-inferior-symbol detecting unit 9 newly added between the block map detecting unit 3 and the pixel-line direction checking unit 4. Other elements are identical to those shown in FIG. 1. In FIG. 3, the same elements as those of FIG. 1 are referred by the same numerals, and a description thereof will be omitted.

The small-block-inferior-symbol detecting unit 9 receives the bit pattern of a small block from the block map detecting unit 3, and outputs information about the inferior symbol of the small block and the bit pattern of the small block that is represented by two statuses, i.e., the inferior symbol of the small block and the superior symbol of the small block. These outputs are supplied to the pixel-line direction checking unit 4.

In what follows, the operation of the small-block-inferior-symbol detecting unit 9 will be described with reference to the four small blocks shown in FIG. 2.

Small blocks B1 and B4 shown in FIG. 2 have an inferior symbol of the small block that is identical to the inferior symbol of the macro block. With respect to these two blocks, the small-block-inferior-symbol detecting unit 9 thus outputs the bit pattern of the small block as it was received, without any change, together with the inferior symbol information of the small block. In small block B3, the inferior symbol of the small block is the superior symbol of the macro block. With respect to the small block B3, therefore, the small-block-inferior-symbol detecting unit 9 outputs the inferior symbol information of the small block, and outputs a bit pattern in which the inferior symbols and the superior symbols are switched within the small block B3.

The bit pattern of the small block, which is output from the block map detecting unit 3 in FIG. 1 or supplied from the small-block-inferior-symbol detecting unit 9, is input to the pixel-line direction checking unit 4. The pixel-line direction checking unit 4 outputs information indicative of a direction of a pixel line, i.e., either the vertical direction or the horizontal direction, which is transmitted together with the coded data. The information indicative of a pixel-line direction may be defined and provided for each macro block, or may be defined and provided for each small block.

Figure 4:
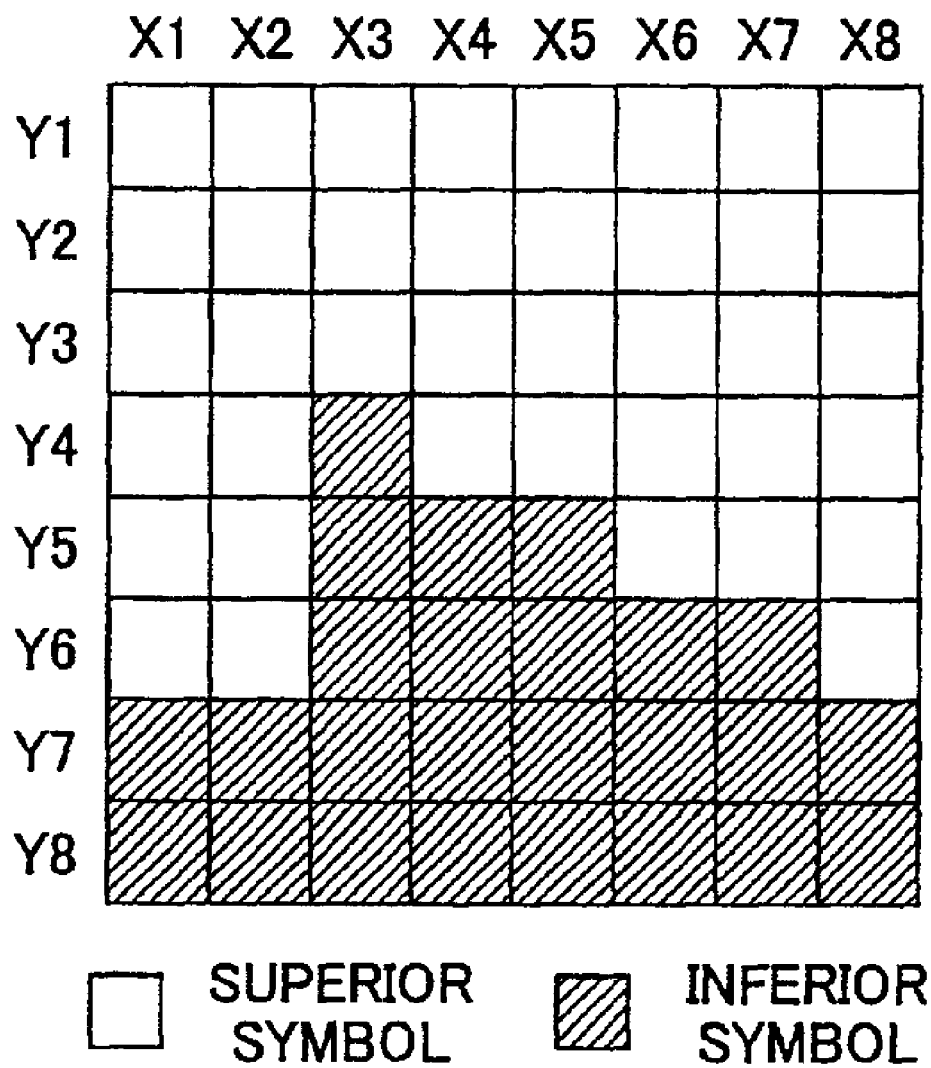
FIG. 4 is an illustrative drawing showing an example of a bit pattern of a small block.

Controlling factors as to which one of the vertical direction or the horizontal direction is selected as a pixel-line direction are not limited to particular implementation in the present invention. In this embodiment, the controlling factor is the number of lines in which an inferior symbol is present, and the direction is selected such as to make the number of lines smaller than otherwise. In the case of a bit pattern of a small block as shown in FIG. 4, for example, there are five horizontal pixel lines that include an inferior symbol, whereas eight vertical pixel lines (all the vertical lines)

include an inferior symbol. The horizontal direction that has the smaller number of lines is thus selected.

The bit pattern of the small block and the information indicative of a pixel-line direction are supplied from the pixel-line direction checking unit 4 to the pixel-line generating unit 5. The pixel-line generating unit 5 outputs a plurality of pixel lines of bit patterns generated by dividing the small block into the pixel lines. The bit patterns of the pixel lines are supplied to the in-line-pixel rearranging unit 6, which outputs pixel rearrangement information and the bit patterns of pixel lines in which pixels are rearranged as specified by the pixel rearrangement information. The pixel rearrangement information is transmitted together with the coded data. The pixel rearrangement information may be defined and provided for each macro block, or may be defined and provided for each small block.

In the following, the rearrangement operation of the in-line-pixel rearranging unit 6 will be described.

In this embodiment, a bit pattern of a pixel line is circularly shifted by the rearrangement processing, and the shift length is used as the rearrangement information. This aspect of the present invention will be described with reference to FIG. 4 and FIG. 5.

Figure 5:
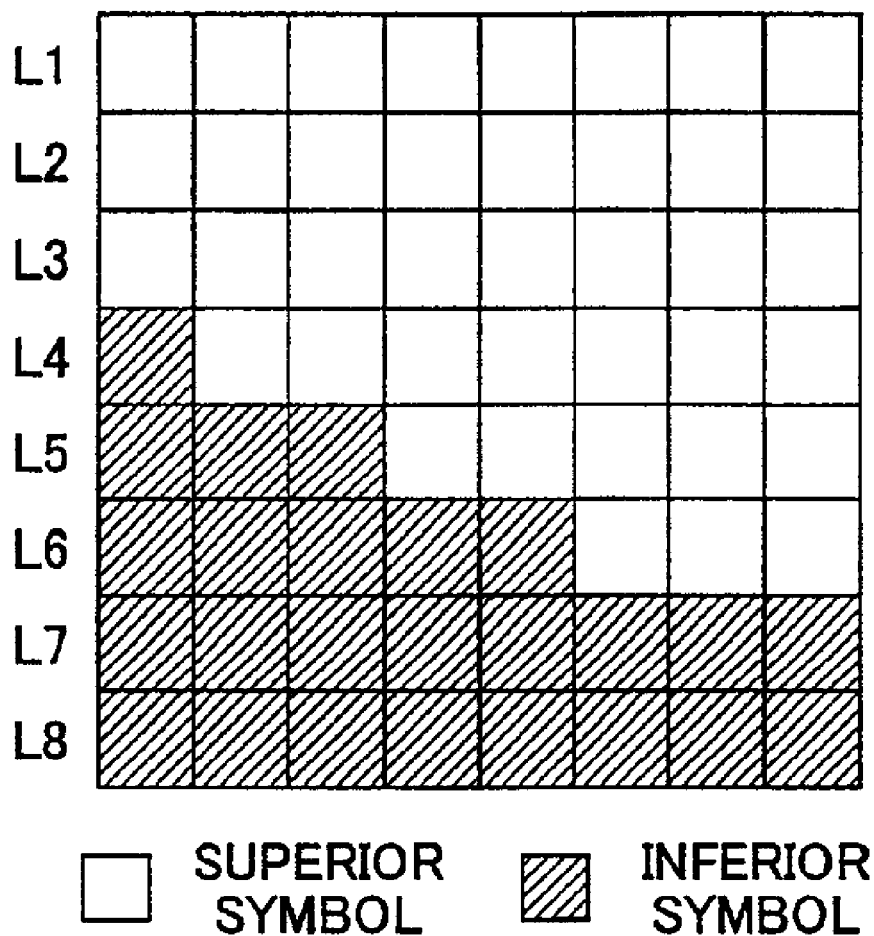
FIG. 5 is an illustrative drawing showing a bit pattern of a small block in which pixels are circularly shifted in the horizontal direction relative to the bit pattern of FIG. 4.

For the sake of explanation, it is assumed that the bit pattern of the small block shown in FIG. 4 (the pixel lines as indicated as Y1 through Y8) is input to the in-line-pixel rearranging unit 6. The pixels lines in the horizontal direction are subjected to circular shifting to the left by two samples, so that the order of columns X1, X2, X3, X4, X5, X6, X7, and X8 are changed to X3, X4, X5, X6, X7, X8, X1, and X2. This produces a bit pattern as shown in FIG. 5. Pixel lines L1 through L8 in the horizontal direction shown in FIG. 5 respectively correspond to the pixel lines Y1 through Y8 in the horizontal direction shown in FIG. 4.

In FIG. 5, the inferior symbols concentrate on the left-hand side in each horizontal pixel lines. In this embodiment, variable length codes are structured by assuming the situations in which inferior symbols concentrate near the beginning of each pixel line (i.e., the left portion of a horizontal pixel line or the top portion of a vertical pixel line). If such rearrangement processing results in a decrease in the volume of codes generated by coding, the shift length "2" indicating the shift by 2 samples is transmitted as the rearrangement information together with the coded data. Further, the bit pattern of FIG. 5 after the rearrangement processing is supplied to the pixel-line map coding unit 7.

If the intended rearrangement processing results in an increase in the volume of codes generated by coding, the rearrangement processing is not actually performed, and the shift length "0" is transmitted as the rearrangement information together with the coded data. Further, the bit pattern of FIG. 4 as it is as received as input signals is supplied to the pixel-line map coding unit 7.

The pixel-line map coding unit 7 receives the pit patterns of bit lines from the in-line-pixel rearranging unit 6, and outputs pixel line map information that indicates pixel lines in which an inferior symbol is present. Further, the pixel-line map coding unit 7 outputs the bit pattern of a pixel line with respect to each pixel line that has an inferior symbol included therein. The pixel line map information is a series of bits that are provided as many as there are pixel lines, and indicate whether an inferior symbol is present in respective pixel lines. This information is coded by variable length codes such as Huffman codes.

In what follows, the operation of the pixel-line map coding unit 7 according to this embodiment will be described.

Figure 6:
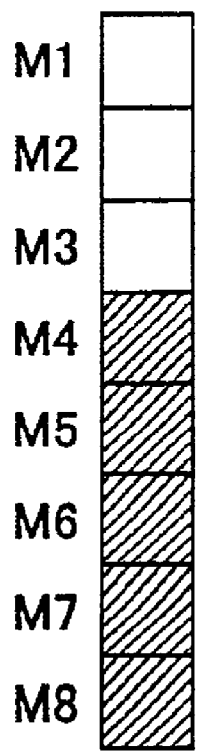
FIG. 6 is an illustrative drawing showing pixel line map information having bits M1 through M8 that correspond to the horizontal direction pixel lines L1 through L8 of FIG. 5.

For the sake of explanation, it is assumed that the bit patterns of the horizontal direction pixel lines L1 through L8 as shown in FIG. 5 are supplied to the pixel-line map coding unit 7. FIG. 6 shows pixel line map information having bits M1 through M8 that correspond to the horizontal direction pixel lines L1 through L8 of FIG. 5. In this embodiment, the bits M1 through M3 of FIG. 6 indicate that the respective pixel lines L1 through L3 include only superior symbols, and the bits M4 through M8 of FIG. 6 indicate that the respective pixel lines L4 through L8 each include at least one inferior symbol. In this manner, the pixel-line map coding unit 7 according to this embodiment outputs the pixel line map information as shown in FIG. 6 and the bit patterns of the horizontal pixel lines L4 through L8 as shown in FIG. 5 in which at least one inferior symbol is present.

The pixel line map information and the bit patterns of horizontal pixel lines having an inferior symbol included therein are input to the pixel-line coding unit 8. The pixel-line coding unit 8 assigns codes to the bit patterns, and the obtained coded data is transmitted to a decoder side.

As described above, the apparatus of this embodiment receives the small block of FIG. 4 representing a partial object shape, and assigns codes to the line bit patterns M4 through M8 of FIG. 6.

According to the present invention described above, a binary rectangular block in which object interior pixels and object exterior pixels are both present are easily and efficiently coded.

Further, the present invention reduces the load of the coding process while avoiding an efficiency reduction caused by data division, thereby making possible the real-time coding of a large shape image such as an image having the size of an HDTV image.

Further, the present invention is not limited to these embodiments, but various variations and modifications may be made without departing from the scope of the present invention.

The present application is based on Japanese priority application No. 2000-322696 filed on Oct. 23, 2000, with the Japanese Patent Office, the entire contents of which are hereby incorporated by reference.

What is claimed is:

1. An apparatus for coding a binary image representing an object shape, comprising:

an inferior symbol detecting unit which decides which one of binary zero and binary one is an inferior symbol that is of smaller occurrence within a given area of the binary image;

a divided portion generating unit which divides a rectangular block of the given area into divided portions;

a map information generating unit which generates map information for each one of the divided portions, the map information indicating whether a corresponding one of the divided portions has the inferior symbol included therein; and a coding unit which encodes only the divided portions that have the inferior symbol included therein, wherein an identification of the inferior symbol, the map information, and the encoded divided portions are output from said apparatus.

2. The apparatus as claimed in claim 1, wherein the binary zero and the binary one represent an interior of the object shape and an exterior of the object shape, respectively.

3. The apparatus us claimed in claim 1, wherein said divided portion generating unit is a pixel-line generating unit that divides the rectangular block into the divided portions that are pixel lines.

4. The apparatus as claimed in claim 3, further comprising:
a block generating unit which divides the given area into rectangular blocks, wherein the given area is one of macro blocks into which the binary image is divided; and
a block map information generating unit which generates block map information indicative of whether a corresponding one of the rectangular blocks has the inferior pixel included therein, wherein each of the rectangular blocks is divided into the divided portions by the divided portion generating unit only if there is the inferior pixel included therein.

5. The apparatus as claimed in claim 3, further comprising:
another inferior symbol detecting unit which detects another inferior symbol within one of macro blocks into which the binary image is divided;
a block generating unit which divides the one of the macro blocks into rectangular blocks including said rectangular block; and
a block map information generating unit which generates block map information indicative at whether a corresponding one of the rectangular blocks has said another inferior pixel included therein, wherein each at the rectangular blocks is divided into the divided portions by the divided portion generating unit only if there is said another inferior pixel included therein.

6. The apparatus as claimed in claim 5, wherein said given area coincides with said rectangular block.

7. The apparatus as claimed in claim 3, further comprising a pixel rearranging unit which rearranges pixels within the pixel lines before said coding unit encodes the divided portions, wherein information about rearrangement of the pixels is output from said apparatus.

8. The apparatus as claimed in claim 1, wherein said coding unit encodes the map information before the map information is output from said apparatus.

9. An apparatus for coding a binary image representing an object shape, comprising:
an inferior symbol detecting unit which decides which one of binary zero and binary one is an inferior symbol that is of smaller occurrence;
a divided portion generating unit which divides a block of the binary image into divided portions; and
a coding unit which encodes only the divided portion that have the inferior symbol included therein.

10. A method of coding a binary image representing an object shape, comprising the steps of:
deciding which one of binary zero and binary one is an inferior symbol that is of smaller occurrence within a given area of the binary image;
dividing a rectangular block of the given area into divided portions: and
encoding only the divided portions that have the inferior symbol included therein.

11. The method as claimed in claim 10, further comprising the steps of:
generating map information for each one of the divided portions, the map information indicating whether a corresponding one of the divided portions has the inferior symbol included therein; and
transmitting to a decoding side an identification of the inferior symbol, the map information, and the encoded divided portions.

12. The method as claimed in claim 10, further comprising the step of:
dividing the given area into rectangular blocks; and
subjecting any given one of the rectangular blocks to said step of dividing a rectangular block only if said any given one of the rectangular blocks has the inferior symbol included therein.

13. An apparatus for coding macro blocks on a macro block-by-macro-block basis, wherein a binary image representing an object shape is divided into the macro blocks each including at least one of interior pixels and exterior pixels of said object shape, the apparatus comprising:
a first unit configured to receive binary image data of one of the macro blocks, to obtain frequencies of occurrences of the interior pixels and the exterior pixels with respect to said one of the macro blocks, to decide a less frequent one of the interior pixels and the exterior pixels as an inferior symbol and a more frequent one of the interior pixels and the exterior pixels as a superior symbol, to output inferior symbol information indicative of which one of the interior pixels and the exterior pixels is the inferior symbol, and to output the binary image data of said one of the macro blocks as a bit pattern represented by the inferior symbol and the superior symbol,
a second unit configured to generate bit patterns of small blocks by dividing the bit pattern corresponding to said one of the macro blocks into a plurality of the small blocks;
a third unit configured to receive the inferior symbol information and the bit patterns of the small blocks, to check whether each of the small blocks includes the inferior symbol, to output a block map information indicative of the check result, and to output only the bit patterns of the small blocks that include the inferior symbol;
a fourth unit configured to receive the output bit patterns of the small blocks that include the inferior symbol, to obtain frequencies of occurrences of the interior pixels and the exterior pixels with respect to each of the received bit patterns of the small blocks, to output new inferior symbol information, to output binary image data of the small blocks that are bit patterns having the inferior symbol and the superior symbol exchanged with each other if the frequencies of occurrences are reversed, and to output the received bit patterns without a change if the frequency of occurrences are not reversed;
a fifth unit configured to divide the bit patterns of the small blocks output from said fourth unit into horizontal or vertical pixel lines to generate bit patterns of pixel lines;
a sixth unit configured to receive the new inferior symbol information and the bit patterns of the pixel lines, to check whether each of the pixel lines includes the inferior symbol, to output the check result as pixel-line map information, to output only the bit patterns of the pixel lines that include the inferior symbol; and
a seventh unit configured to encode, on a pixel-line-by-pixel-line basis, only the pixel lines that include the inferior symbol.

14. The apparatus as claimed in claim 13, further comprising a unit configured to perform a rearranging process for rearranging a sequence of pixel arrangement when the bit patterns of the pixel lines are encoded, wherein the encoding of the pixel lines is performed with respect to the rearranged bit patterns.

15. An apparatus for coding macro blocks on a macro block-by-macro-block basis wherein a binary image representing an object shape is divided into the macro blocks each including at least one of interior pixels and exterior pixels of said object shape, the apparatus comprising:

a first unit configured to receive binary image data of one of the macro blocks, to obtain frequencies of occurrences of the interior pixels and the exterior pixels with respect to said one of the macro blocks, to decide a less frequent one of the interior pixels and the exterior pixels as an inferior symbol and a more frequent one of the interior pixels end the exterior pixels as a superior symbol, to output inferior symbol information indicative of which one of the interior pixels and the exterior pixels is the inferior symbol, and to output the binary image data of said one of the macro blocks as a bit pattern represented by the inferior symbol and the superior symbol, a second unit configured to generate bit patterns of small blocks by dividing the bit pattern corresponding to said one of the macro blocks into a plurality of the small blocks;

a third unit configured to receive the inferior symbol information and the bit patterns of the small blocks, to check whether each of the small blocks includes the inferior symbol, to output a block map information indicative of the check result, and to output only the bit patterns of the small blocks that include the inferior symbol;

a fourth unit configured to receive the output bit patterns of the small blocks that include the inferior symbol, to obtain frequencies of occurrences of the interior pixels and the exterior pixels with respect to each of the received bit patterns of the small blocks, to output new inferior symbol information, to output binary image data of the small blocks that are bit patterns having the inferior symbol and the superior symbol exchanged with each other if the frequencies of occurrences are reversed, and to output the received bit patterns without a change if the frequency of occurrences are not reversed;

a line-direction identifying unit configured to receive the new inferior symbol information and the bit patterns of the small blocks output from said fourth unit, and to select a pixel-line direction that is one of a horizontal direction and a vertical direction that produces fewer pixel lines including the inferior symbols when the received bit patterns of the small block are divided into horizontal pixel lines or vertical pixel lines;

a fifth unit configured to divide the bit patterns of the small blocks output from said fourth unit into pixel lines extending in the selected pixel-line direction to generate bit patterns of pixel lines;

a sixth unit configured to receive the new inferior symbol information and the bit patterns of the pixel lines, to check whether each of the pixel lines includes the inferior symbol, to output the check result as pixel-line map information, to output only the bit patterns of the pixel lines that include the inferior symbol; and a seventh unit configured to encode, on a pixel-line-by-pixel-line basis, only the pixel lines that include the inferior symbol.

16. The apparatus as claimed in claim 15, further comprising a unit configured to perform a rearranging process for rearranging a sequence of pixel arrangement when the bit patterns of the pixel lines are encoded, wherein the encoding of the pixel lines is performed with respect to the rearranged bit patterns.

* * * * *